United States Patent [19]

Granström

[11] Patent Number: 4,812,117
[45] Date of Patent: Mar. 14, 1989

[54] METHOD AND DEVICE FOR PRE-HEATING WASTE METAL FOR FURNACES

[75] Inventor: Staffan Granström, Öjebyn, Sweden

[73] Assignee: NAB-Konsult, Piteå, Sweden

[21] Appl. No.: 133,065

[22] PCT Filed: Apr. 15, 1987

[86] PCT No.: PCT/SE87/00195
§ 371 Date: Dec. 14, 1987
§ 102(e) Date: Dec. 14, 1987

[87] PCT Pub. No.: WO87/06331
PCT Pub. Date: Oct. 22, 1987

[30] Foreign Application Priority Data
Apr. 15, 1986 [SE] Sweden ................ 860169

[51] Int. Cl.⁴ .............................................. F27D 3/00
[52] U.S. Cl. ........................................ 432/9; 432/28; 432/72; 432/180
[58] Field of Search ................ 432/9, 28, 72, 179, 432/180, 82; 373/9, 80; 266/156, 157

[56] References Cited
U.S. PATENT DOCUMENTS

| | | | |
|---|---|---|---|
| 3,207,493 | 9/1965 | Swain | 432/180 |
| 3,870,474 | 3/1975 | Houston | 432/180 |
| 4,021,192 | 5/1977 | Ferguson | 432/28 |
| 4,060,913 | 12/1977 | Yoshida et al. | 432/180 |
| 4,230,451 | 10/1980 | Chambe | 432/72 |
| 4,242,084 | 12/1980 | Jamaluddin | 432/28 |
| 4,375,958 | 3/1983 | Date et al. | 432/9 |
| 4,437,186 | 3/1984 | Inai | 373/9 |
| 4,478,574 | 10/1984 | Okuno et al. | 432/180 |

FOREIGN PATENT DOCUMENTS 2162293 1/1986 United Kingdom .

Primary Examiner—Henry C. Yuen
Attorney, Agent, or Firm—Burns, Doane, Swecker & Mathis

[57] ABSTRACT

This invention relates to a method and a device for pre-heating waste metal for furnaces, fuel gases generated in a furnace (1) being supplied simultaneously or sequentially to two pre-heating places (3, 4) with waste metal containers (14), said flue gases being made to flow through a combustion chamber (19) provided with a burner (20) before being supplied to the pre-heating places (3, 4), said burner (20) producing a variable amount of hot gases for admixture with the flue gases from the furnace (1) and superheating thereof. After flowing through the waste metal containers (14) burnt flue gases are supplied to a gas cleaning plant (5) for flue gases and unburnt flue gases to the combustion chamber (19) for further combustion, after which the flue gases now burnt are supplied to said gas cleaning plant (5).

15 Claims, 1 Drawing Sheet

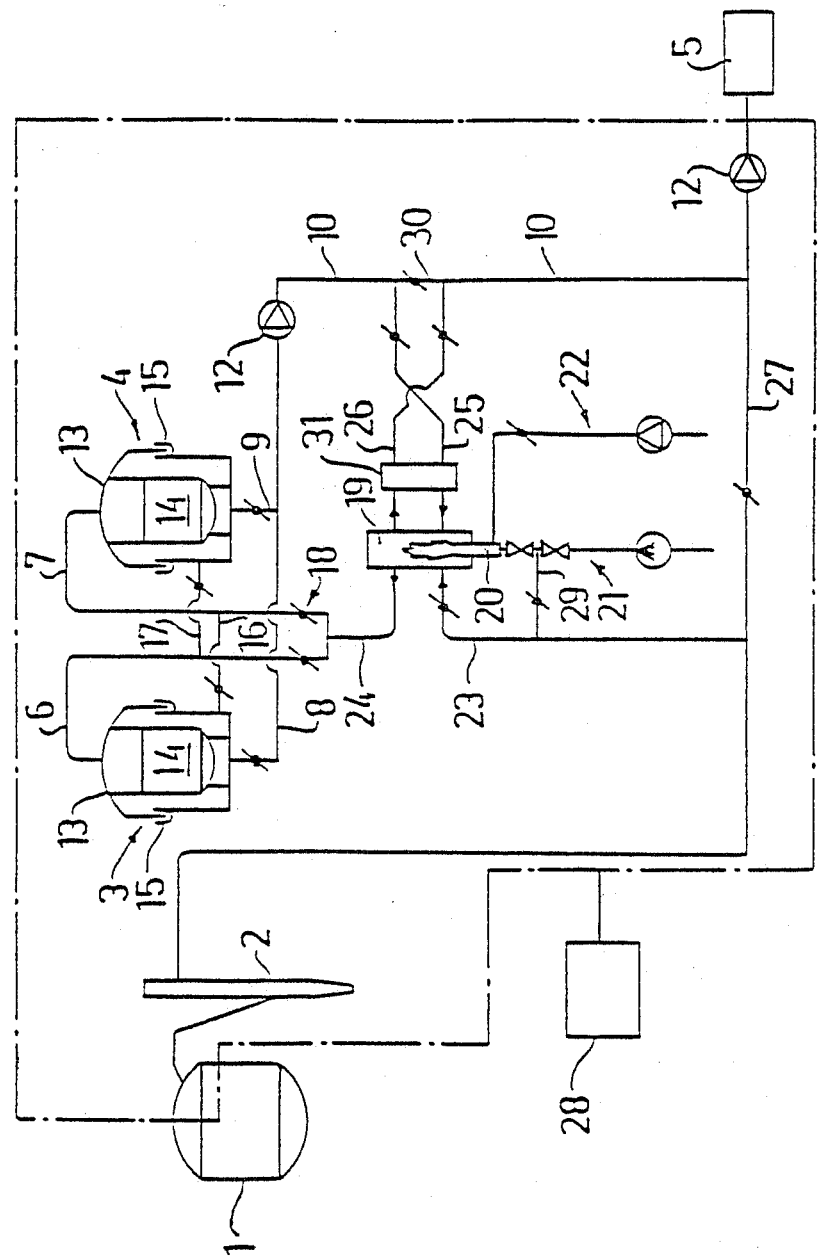

METHOD AND DEVICE FOR PRE-HEATING WASTE METAL FOR FURNACES

This invention relates to a method and a device for pre-heating waste metal for furnaces, flue gases generated in a furnace being supplied simultaneously or sequentially to two pre-heating chambers with waste metal containers.

In the electric steel industry waste metal can be utilized as main raw material in electric arc furnaces. Moreover, waste metal can be used as cooling agents in basic oxygene furnaces.

In both cases a controlled pre-heating of the waste metal will bring an improved operation economy.

Methods and devices of the kind mentioned by way of introduction are previously known where the flue gases after flowing through the pre-heating chambers are recycled to a combustion chamber or dust collector directly connected to the furnace for post-combustion of unburnt flue gases. However, it has been found that the combustion of flue gases in such a combustion chamber will be incomplete and uncontrollable due to a temperature from the furnace varying in time. Moreover, the waste metal cannot be heated as cold flue gases are generated in the furnace e.g. at times with no connected power.

It is the object of this invention to provide an improved method and an improved device of the kind indicated above, and this object has been achieved by means of the characteristic features of the method and the device defined in the claims.

One advantage of the invention in comparison with previous solutions is that the invention suggests a combustion chamber provided with a controlled burner of its own, by means of which unburnt gases from the electric arc furnace, on one hand, and, on the other hand, from the pre-heating chambers are post-combusted and destructed at a temperature controllable in time. Moreover, a larger amount of energy is added to the flue gases which is then recycled to the process via a hotter waste metal. The location of the combustion chamber is independent of the position of the electric arc furnace. In other words, it can thus be placed in a direct connection with the pre-heating chambers. Moreover, the waste metal can also be heated at times with cold flue gases from the furnace by means of the burner.

An illustrative example of the invention will be described below with reference to the enclosed drawing which shows schematically a device according to the invention.

A pre-heating device according to the invention is shown with reference to the figure. Flue gases generated in an electric arc furnace/basic oxygen furnace are evacuated via a dust collector 2 to a combustion chamber 19 provided with a burner 20 and thereafter further to two pre-heating chambers 3 and 4.

The burner 20 is intended to produce hot flue gases for admixture with flue gases from the furnace 1 and for post-combustion of unburnt gases from the furnace 1 and from the pre-heating chambers 3 and 4.

The burner 20 can be fired e.g. by means of oil, carbon powder, gas or biofuel (powder). In the figure 21 designates the fuel supply system of the burner and 22 its air supply system.

It is also possible to have the burner 20 consist of an electric plasma burner for production of hot air which can be mixed with the flue gases from the furnace 1 and/or the chambers 3 and 4.

The combustion chamber 19 is provided with connecting ducts for flue gases; an inlet duct 23 for flue gases from the furnace 1, an outlet duct 24 for superheated flue gases to the pre-heating chambers 3 and 4, an inlet duct 25 for unburnt flue gases from the chambers 3 and 4 and an outlet duct 26 for burnt flue gases to the gas cleaning plant 5 for flue gases. A by-pass duct 27 for flue gases is arranged between the inlet duct 23 and the outlet 10 and a by-pass duct 30 is arranged between the ducts 25 and 26.

The pre-heating chambers 3 and 4 are each provided with an inlet duct 6 and 7, respectively, and an outlet duct 8 and 9, respectively. The outlet ducts 8 and 9 are connected to a common outlet 10.

In order to achieve evacuation of the flue gases flue gas fans 12 with a variable speed are arranged in the outlet 10 and immediately upstream the plant 5, respectively.

The pre-heating chambers 3 and 4 comprise each a liftable roof 13 which is intended to be sealingly adapted on top of a waste metal container 14 in the respective chamber 3 and 4. Said containers 14 which can constitute for example a basket or a chute placed on a carriage are preferably provided with a water-cooled jacket and a water-cooled bottom with automatic connection of cooling water and emptying of the water circuits upon charging of the wate metal in the furnace in order to be able to withstand the high gas temperatures (500°-1000° C.). The sealing between the covers 13 and the chambers 3 and 4, respectively, can be achieved for instance by means of an annular waterseal 15.

The pre-heating chambers 3 and 4 are mutually connected by means of a crosswise connection system, i.e. the chamber 3 is connected to the inlet duct 7 by means of a passage 16 while the chamber 4 is connected to the inlet duct 6 by means of a passage 17.

In order to enable control of the flue gas flow the ducts included in the device are provided with adjustable and controllable flue gas dampers 18.

The flow of the flue gases through the chambers 3 and 4 will be described in the following. The flue gases are led via the inlet duct 6 to the chamber 3 containing a waste metal basket 14 next in turn to be charged. The flue gases flow through the waste metal container 14 and further through holes in the bottom of the container 14 into the chamber 3. The crosswise connection system makes it possible to lead the flue gases via the ducts 16 and 7 to the pre-heating chamber 4 in which the flow is in the same way as in the chamber 3. The flue gases are thereafter evacuated through the outlet duct 9 and the outlet 10 either to the flue gas cleaning plant 5 or to the combustion chamber 19.

The flue gases can also be led directly from the chamber 3 to the outlet 10 without passing the chamber 4.

Of course the flue gases can first be made to pass the chamber 4 if it is found that the waste metal container 14 therein is next in turn for charging. The crosswise connection system is then utilized in the same way as described above.

Normally the flue gases are first supplied to the chamber containing the hot waste metal basket, so-called cascade heating. However, it is also possible first to supply the flue gases to the chamber containing the cold waste metal basket, for instance a new inserted basket. In this latter heating cycle, so-called reversible heating, a high temperature (800°-1000° C.) is obtained by means of the hot flue gases in the upper part of the cold waste metal basket. The flue gases are thereafter made to flow via the crosswise connection system through the next chamber with a waste metal basket previously heated in the same way. The possible unburnt flue gases after heating the waste metal in the waste metal basket colder from the beginning will then be ignited, post-combusted and destructed to some extent in the waste metal in the waste metal basket hot from the beginning. Thus, in this way a started post-combustion of the flue gases already in the waste metal basket with a following post-combustion in the combustion chamber 19 provided with the burner 20 is achieved.

In case pre-heating is not concerned the gases can be evacuated from the furnace 1 directly via the by-pass duct 27 to the gas cleaning plane 5.

When the device is in operation the flue gases generated in the furnace 1 stream into the combustion chamber 19 via the duct 23. The superheated flue gases leave the chamber 19 via the duct 24 and flow thereafter through the pre-heating chambers 3 and 4 in the way previously described. After flowing through the chambers 3 and 4 the flue gases can be led directly to the plant 5 via the ducts 10 and 30 or be recycled through the combustion chamber 19 via the ducts 25 and 26.

In order to increase the temperature in the combustion chamber 19 and to improve the power efficiency a heat exchanger 31 is arranged between the ducts 25 and 26.

The ratio of gases generated by the burner 20 to flue gases generated in the furnace 1 can be varied thanks to the fact that the capacity of the burner 20 is adjustable steplessly. If the furnace 1 does no generate any flue gases at all the burner 20 can generate alone a sufficient amount of flue gases for pre-heating the waste metal.

When the furnace 1 is an basic oxygene furnace there will be difficulties in leading the hot unburnt gases to the chambers 3 and 4 and the combustion chamber 19, respectively, and therefore the burner 20 in this case accounts alone for the pre-heating of the waste metal. On the other hand, the hot flue gases are more suitable for use as fuel. For example, the gases can be supplied to the fuel supply system 21 via the duct 29 after treatment.

Process control of the pre-heating device can be carried out by means of a microprocessor 28 which also controls the part systems included in the device in addition to the control of dampers 18, roof lifting device (not shown) and fans 12.

The invention is not restricted to what has been shown and described, but amendments and modifications thereof are possible within the scope of the invention idea defined in the claims.

I claim:

1. A method for pre-heating waste metal for furnaces comprising:
    (a) generating flue gases in a furnace;
    (b) supplying said flue gases to at least one of a plurality of pre-heating chambers, each having a waste metal container;
    (c) prior to (b), flowing said flue gases through a combustion chamber provided with a burner which produces hot gases and admixing said hot gases from said burner with said furnace flue gases and superheating said admixture;
    (d) supplying burnt flue gases from said pre-heating chambers to a gas cleaning plant;
    (e) recirculating unburnt flue gases from said pre-heating chambers to said combustion chamber;
    (f) post-combusting said recirculated unburnt flue gases in said combustion chamber; and
    (g) supplying said post-combusted burnt flue gases to said gas cleaning plant.

2. The method of claim 1, comprising steplessly adjusting the amount of flue gases produced by said burner, such that said burner produces a sufficient amount of hot gases along for supply to said pre-heating chambers when hot flue gases are not generated in said furnace.

3. The method of claim 2, comprising supplying at least a portion of said flue gases from the furnace to a fuel supply system of said burner.

4. The method of claim 2, comprising flowing said flue gases through a colder one of said waste metal containers, and thereafter flowing said flue gases through a hotter one of said waste metal containers, thereby initiating the post-combustion of said flue gases in the latter waste metal container.

5. The method of claim 1, comprising supplying at least a portion of said flue gases from the furnace to a fuel supply system of said burner.

6. The method of claim 5, comprising flowing said flue gases through a colder one of said waste metal containers, and thereafter flowing said flue gases through a hotter one of said wate metal containers, thereby initiating the post-combustion of said flue gases in the latter waste metal container.

7. The method of claim 1, comprising flowing said flue gases through a colder one of said waste metal containers, and thereafter flowing said flue gases through a hotter one of said waste metal containers, thereby initiating the post-combustion of said flue gases in the latter waste metal container.

8. The method of claim 1, comprising supplying said flue gases sequentially to each of said pre-heating chambers.

9. A device for pre-heating waste metal for furnaces, comprising:
    a plurality of pre-heating chambers with waste metal containers in communication with said furnace;
    a combustion chamber provided with a burner capable of producing a variable amount of hot gases for admixture with the flue gases from said furnace and of superheating the admixture;
    said combustion chamber comprising an inlet in communication with said furnace for receiving flue gases generated in said furnace,
    an outlet in communication with said pre-heating chambers for superheated flue gases,
    an inlet in communication with said pre-heating chambers for receiving unburnt flue gases,
    an outlet in communication with a gas cleaning plate for burnt flue gases and
    a by-pass duct disposed between said unburnt pre-heating chamber flue gas inlet and said burnt combustion chamber flue gas outlet for supply of burnt flue gases from said pre-heating chamber direct to said gas cleaning plant.

10. The device of claim 9, wherein said combustion chamber comprises a burner fuel supply system provided with an inlet in communication with said furnace for receiving furnace flue gases.

11. The device of claim 10, wherein said unburnt pre-heating chamber flue gas inlet and said burnt combustion chamber flue gas outlet are connected to a heat exchanger disposed between said unburnt pre-heating chamber flue gas inlet and said burnt combustion chamber flue gas outlet.

12. The device of claim 10, wherein said device is provided with a flue gas damper for control of the flue gas flow and flue gas fans for evacuating said flue gases.

13. The device of claim 9, wherein said unburnt pre-heating chamber flue gas inlet and said burnt combustion chamber flue gas outlet are connected to a heat exchanger disposed between said unburnt pre-heating chamber flue gas inlet and said burnt combustion chamber flue gas outlet.

14. The device of claim 13, wherein said device is provided with a flue gas damper for control of the flue gas flow and flue gas fans for evacuating said flue gases.

15. The device of claim 7, wherein said device is provided with a flue gas damper for control of the flue gas flow and flue gas fans for evacuating said flue gases.

* * * * *